United States Patent
Kurrle et al.

(10) Patent No.: US 8,104,595 B2
(45) Date of Patent: Jan. 31, 2012

(54) HYDRAULIC CONTROL DEVICE OF A CLUTCH OF A MOTOR VEHICLE

(75) Inventors: Frank Kurrle, Pleidelsheim (DE); Joachim Esser, Rutesheim (DE); Jan Pfingst, Sersheim (DE); Arne Krüger, Karlsruhe (DE); Thorsten Böger, Böblingen-Dagersheim (DE)

(73) Assignee: Dr. Ing. h.c. F. Porsche AG, Stuttgart (DE)

( * ) Notice: Subject to any disclaimer, the term of this patent is extended or adjusted under 35 U.S.C. 154(b) by 618 days.

(21) Appl. No.: 12/341,451

(22) Filed: Dec. 22, 2008

(65) Prior Publication Data

US 2009/0158866 A1   Jun. 25, 2009

(30) Foreign Application Priority Data

Dec. 21, 2007 (DE) .......................... 10 2007 062 147

(51) Int. Cl.
*F16D 25/10* (2006.01)
(52) U.S. Cl. ..................................... 192/3.58; 192/85.63
(58) Field of Classification Search .................... None
See application file for complete search history.

(56) References Cited

U.S. PATENT DOCUMENTS

| | | | | |
|---|---|---|---|---|
| 5,020,393 A | * | 6/1991 | Kuwayama et al. | 477/153 |
| 7,575,111 B2 | * | 8/2009 | Ogata et al. | 192/3.58 |
| 2007/0270281 A1 | * | 11/2007 | Inoue et al. | 477/180 |

FOREIGN PATENT DOCUMENTS

| | | |
|---|---|---|
| DE | 19606318 A1 | 8/1997 |
| DE | 10243282 A1 | 4/2004 |
| DE | 102004003288 A1 | 8/2004 |
| JP | 2209668 A | 8/1990 |
| JP | 7027193 A | 1/1995 |

* cited by examiner

*Primary Examiner* — Rodney Bonck

(57) ABSTRACT

A hydraulic control unit is set up to hydraulically actuate a starting clutch of a motor vehicle and gear selectors of a transmission of the motor vehicle by use of hydraulic valves which are integrated in the hydraulic control unit and which have in each case at least one control element. The hydraulic control unit is characterized in that the integrated hydraulic valves are aligned in the hydraulic control unit in such a way that a movement direction of a vibratory element of a hydraulic valve which controls only the starting clutch differs from the movement direction of vibratory elements of the other hydraulic valves, and is aligned to a lesser extent with the longitudinal axis of the motor vehicle.

5 Claims, 2 Drawing Sheets

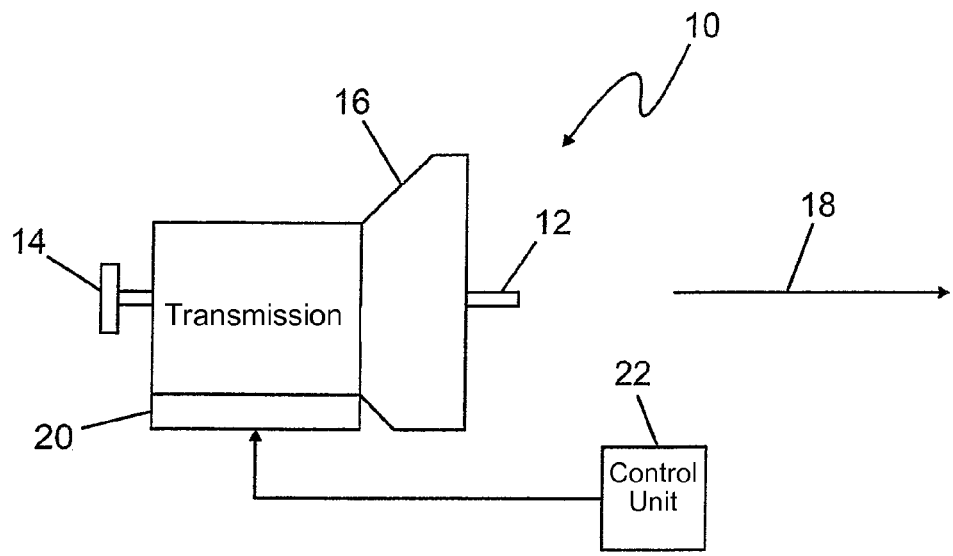
FIG. 1
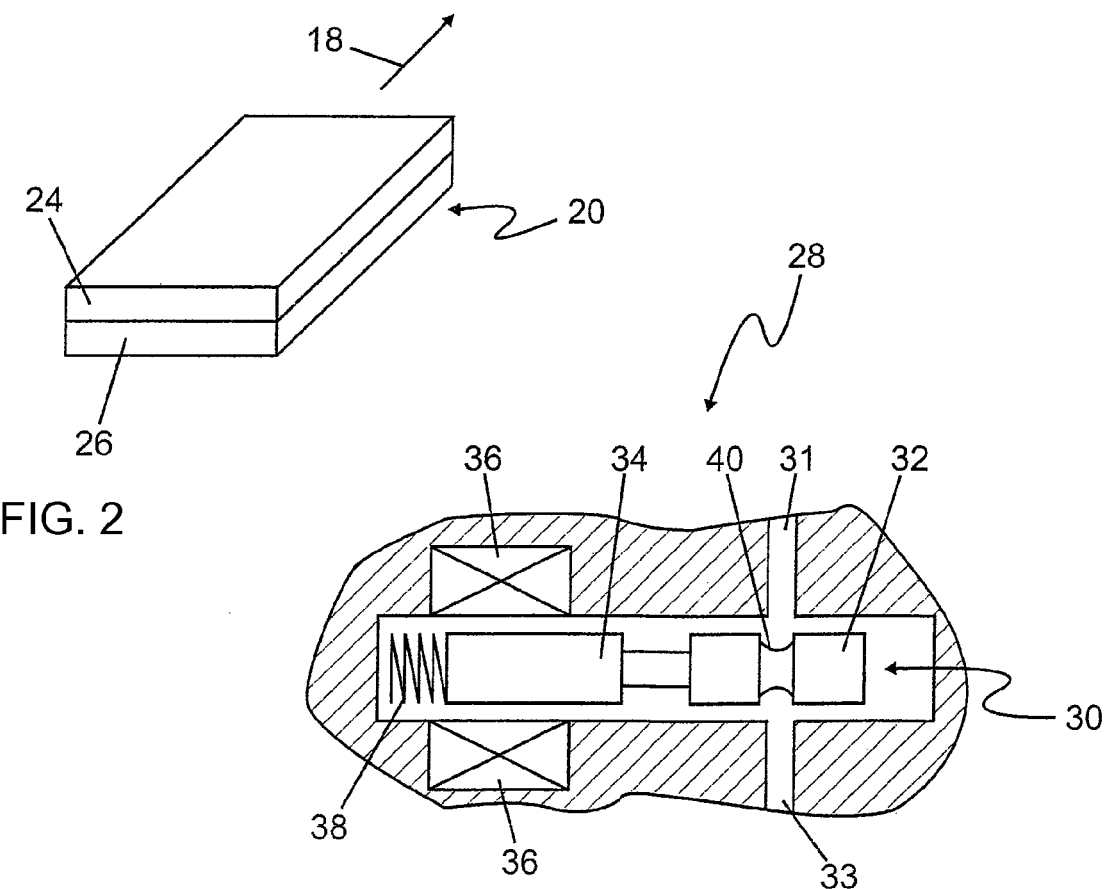
FIG. 2
FIG. 3

HYDRAULIC CONTROL DEVICE OF A CLUTCH OF A MOTOR VEHICLE

CROSS-REFERENCE TO RELATED APPLICATION

This application claims the priority, under 35 U.S.C. §119, of German application DE 10 2007 062 147.9-14, filed Dec. 21, 2007; the prior application is herewith incorporated by reference in its entirety.

BACKGROUND OF THE INVENTION

Field of the Invention

The invention relates to a hydraulic control unit which is set up to hydraulically actuate a starting clutch of a motor vehicle and gear selectors of a transmission of the motor vehicle by use of hydraulic valves which are integrated in the hydraulic control unit and which have in each case at least one control element.

Here, a hydraulic actuation is to be understood to mean that the actuating force is generated in a controlled manner from a hydraulic pressure without the active participation of the driver. A clutch actuation in which a driver introduces the actuating force into a master cylinder by a clutch pedal, and the resulting pressure is transmitted only hydraulically to a slave cylinder which is coupled to the clutch mechanism, is therefore not a hydraulic actuation within the context of this application.

The control element is composed for example of a spring-loaded piston of the hydraulic valve.

At present, the proportion of motor vehicles which are fitted with transmissions with hydraulically actuated clutch plates and gear selectors is increasing. Here, the transmissions may be automatic transmissions (planetary gear sets) with a starting clutch, automated shift transmissions or dual-clutch transmissions. The hydraulic control device of the transmissions generally has a plurality of hydraulic valves, one of which is assigned individually to the starting clutch.

A hydraulic control device of the type is known for example from German patent DE 102 43 282, which discloses in particular a dual-clutch transmission having two partial transmissions with in each case one actively closable engine clutch (friction clutch) and a plurality of gears which can be selected by gear selector clutches (claw clutches). In DE 102 43 282, the force flow via engine clutches, at least one of which serves as a starting clutch, is preferably controlled by a series connection of a pressure regulating valve and a throughflow valve. Here, the pressure regulating valve serves to regulate the actuating force, and the throughflow valve serves to regulate the actuating speed. On account of the asynchronous actuation of the gear selector and clutch actuator which are assigned to one partial transmission, only one pressure regulating valve is used per partial transmission for controlling the working pressures of the clutch actuator and of the gear selector. However, each engine clutch is individually assigned a separate throughflow valve. DE 102 43 282 also discloses that the activation of the clutch actuator and gear selector need not necessarily take place by a series connection of a pressure regulating valve and a throughflow valve, and may also take place directly by in each case one of the stated valves.

Published, non-prosecuted German patent application DE 196 06 318 A1 discloses a pressure regulating valve for electrohydraulic transmission controllers of a motor vehicle, which pressure regulating valve has a spring-loaded armature as a control element.

As is the case with clutches whose actuating force is applied by a driver, it is also possible for a so-called judder to occur during starting in motor vehicles with a hydraulically actuated clutch. Juddering is a vibration in the drivetrain of motor vehicles which occurs during the slipping phase of the clutch. Juddering is caused by periodic alternating torques which are generated in the region of the slipping clutch and which lie in the natural frequency range of the drivetrain which is dynamically separated by the slipping clutch.

An undesired clutch judder may occur to a greater or lesser extent during starting in motor vehicles with hydraulically controlled and actuated clutches.

SUMMARY OF THE INVENTION

It is accordingly an object of the invention to provide a hydraulic control device of a clutch of a motor vehicle that overcomes the above-mentioned disadvantages of the prior art devices of this general type, which specifies a technical solution for preventing or reducing clutch judder in motor vehicles with a hydraulically actuated and controlled starting clutch in which the clutch judder occurs comparatively often and/or to a comparatively pronounced extent during starting.

With the foregoing and other objects in view there is provided, in accordance with the invention, a hydraulic control unit set up to hydraulically actuate a starting clutch of a motor vehicle and gear selectors of a transmission of the motor vehicle. The hydraulic control unit includes hydraulic valves having in each case at least one vibratory element. The hydraulic valves are aligned in the hydraulic control unit such that a movement direction of the vibratory elements of one of the hydraulic valves which controls only the starting clutch differs from a movement direction of the vibratory elements of other ones of the hydraulic valves, and are aligned to a lesser extent with a longitudinal axis of the motor vehicle.

The object is based on the knowledge that the alignment of a hydraulic valve, which controls the clutch engagement, relative to the longitudinal axis of the motor vehicle is decisive for whether longitudinal vibrations of the motor vehicle and/or of its drivetrain and/or of its drive unit are coupled into the hydraulic control and actuation of the clutch. Under unfavorable conditions, such a coupling-in or feedback of the clutch excitation may lead to pressure vibrations in the hydraulics of the clutch controller, which pressure vibrations are manifested in fluctuations of the contact pressure which acts on the friction surfaces of the clutch, and therefore lead to the undesired judder or to a more pronounced judder.

The hydraulic control devices with integrated hydraulic valves are generally produced as a structural unit and are mounted as such onto a transmission. Hydraulic control devices are often composed of a so-called duct plate and a valve housing or valve carrier for holding the hydraulic valves. The duct plate generally has a multiplicity of ducts, by which the hydraulic valves are connected to an oil pressure supply of the transmission. The installation position of the hydraulic valves is therefore defined by the construction of the duct plate and of the valve carrier, in particular by the layout of the ducts, and cannot be easily changed. Here, the hydraulic valves are generally arranged adjacent to one another with the same installation direction. The hydraulic control device is also usually mounted on the underside of the transmission, that is to say on the sump of the transmission. Depending on the installation space conditions, this generally results in a uniformly-aligned arrangement of all the hydraulic valves either in the longitudinal direction, in the transverse direction or in the vertical direction of the motor vehicle.

The inventors have recognized that the undesired clutch judder occurs to a more pronounced extent and/or more often in motor vehicles with hydraulic valves aligned in the longitudinal direction of the motor vehicle than in motor vehicles with hydraulic valves aligned in the transverse direction. On account of the necessary design adaptations of the hydraulic control unit to the transmission, and also on account of the installation space conditions, it may be the case that the complete hydraulic control unit can be arranged only in the longitudinal direction. In such cases, the invention, in which the hydraulic valve which serves to activate only for actuating the clutch is turned away from the longitudinal axis of the motor vehicle to a certain extent, provides a solution which is structurally comparatively less complex and is space-saving.

As a result of the integrated hydraulic valves being aligned in the hydraulic control device in such a way that a movement direction of a vibratory element of a hydraulic valve which controls only the starting clutch differs from the movement direction of vibratory elements of the other hydraulic valves, and is aligned to a lesser extent with the longitudinal axis of the motor vehicle, a coupling-in or feedback of longitudinal vibrations into the clutch activation is reduced. An undesired build-up of vibrations in the drivetrain which manifests itself in the undesired judder is thereby effectively reduced. The vibratory element has, for example, a spring-loaded piston of the hydraulic valve, and may have further vibrating masses, for example concomitantly vibrating hydraulic fluid.

It is self-evident that the features stated above and the features yet to be explained below can be used not only in the respectively specified combination but also in other combinations or individually without departing from the scope of the present invention.

Other features which are considered as characteristic for the invention are set forth in the appended claims.

Although the invention is illustrated and described herein as embodied in a hydraulic control device of a clutch of a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 1 is an illustration showing the technical field of the invention;

FIG. 2 is a diagrammatic, perspective view of a hydraulic control unit;

FIG. 3 is a schematic illustration of a hydraulic valve; and

DETAILED DESCRIPTION OF THE INVENTION

Figure 4:
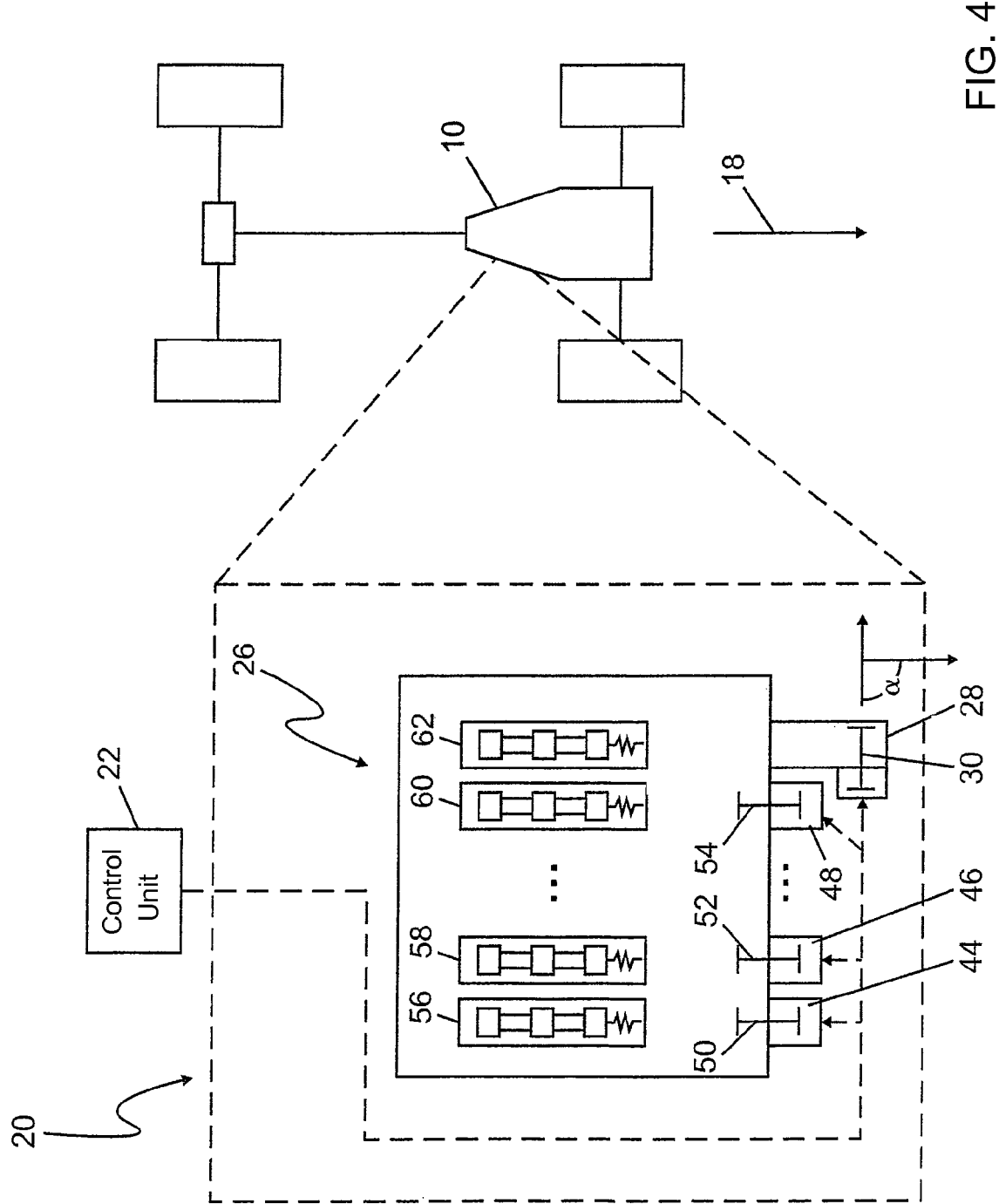
FIG. 4 is an illustration showing a valve housing of the hydraulic control unit from FIG. 2, with an exemplary embodiment of an arrangement according to the invention of hydraulic valves.

Referring now to the figures of the drawing in detail and first, particularly, to FIG. 1 thereof, there is shown a motor vehicle transmission 10 having a transmission input shaft 12 and one possible transmission output 14. In the assembled state, the transmission input shaft 12 is connected by a starting clutch to a drive output of an internal combustion engine, while the transmission output 14 is connected by further gearings and/or shafts to the drive wheels of the motor vehicles. For clarity, neither the internal combustion engine nor the transmission of force between the transmission output 14 and the drive wheels have been illustrated in FIG. 1. The starting clutch is situated within a clutch bell 16.

A known starting clutch has at least one driver disk and a pressure plate. The driver disk is rotationally fixedly connected, by a spline toothing, to the transmission input shaft, and has circular-ring-shaped friction linings which, when the clutch is open, come to rest between a flywheel disk of the internal combustion engine and a clutch pressure plate which is connected in a rotationally fixed yet axially movable manner to the flywheel disk, while the flywheel disk and the pressure plate rotate when the internal combustion engine is running. As the clutch is closed, the pressure plate is pressed in the direction of the flywheel disk, as a result of which the driver disk is pressed both against the pressure plate and also against the flywheel disk. In this way, torque of the internal combustion engine is transmitted to the driver disk and via the transmission to the drive wheels. The motor vehicle is set in motion along its longitudinal axis 18.

Dry-running or wet-running multiplate clutches are also known as starting clutches. A multiplate clutch generally has a plurality of inner plates and a plurality of outer plates. The inner plates are held by a rotating toothed shaft and the outer plates are held by an internally-toothed tubular carrier so as to be rotationally fixedly connected to the carrier. The plates are movable in the axial direction. By pressing the inner plates and the outer plates together, a force-fitting action is produced between the inner plates and the outer plates, which force-fitting action permits a transmission of torque between the carrier and the shaft, and therefore between the engine and the transmission. In the case of a hydraulically actuated multiplate clutch, the plates are pressed against one another by hydraulic pressure forces. The torque which can be transmitted via the multiplate clutch between the engine and the transmission is controlled by controlling the hydraulic pressures.

In the transmissions considered here, the transmission 10 and the clutch are controlled by a hydraulic control unit 20 and an electronic control unit 22. The electronic control unit 22 is set up, in particular programmed, to process items of information regarding operating parameters of the motor vehicle such as vehicle speed, driver demand, torque output and rotational speed of the internal combustion engine, and to form activation signals for the hydraulic control unit 20 from the information. The hydraulic control unit 20 is set up to hydraulically activate the hydraulic clutch actuators and gear selectors as a function of the stated activation signals.

Conventional automatic transmissions, automated shift transmissions and dual-clutch transmissions generally have a pressurized oil circuit to which the hydraulic control unit 20 can be connected. The hydraulic control unit 20 is usually connected to an oil sump on the underside of the transmission 10, as illustrated in FIG. 1.

FIG. 2 schematically shows the hydraulic control unit 20 having a duct plate 24 and having a valve carrier or valve housing 26. Arranged in the valve housing 26 are hydraulic valves which are electrically activated by the control unit 22 and which control and/or regulate oil pressures and/or oil flows for the clutch actuators and gear selectors. In one refinement, the gear selectors are realized as hydraulically actuated shift rods, by which the force flow is switched between different gearwheels and a main transmission shaft in the transmission 10.

As a clutch actuator, consideration is given to a slave cylinder which, when pressurized, lifts the pressure plate, by a mechanism, away from the driver disk counter to a spring force which exerts a pressing action. Alternatively, in particular in the case of a clutch which runs in an oil bath, it is possible for an oil pressure which exerts a pressing action to be varied. In any case, the pressure force which acts on the driver disk or on the plates on the multiplate clutch is dependent on the pressure of the oil which flows through a hydraulic valve which, in the form of a pressure regulating valve and/or a throughflow regulating valve, is arranged in the valve housing 26, is provided for controlling the clutch and is activated correspondingly. Here, the hydraulic valves of the hydraulic control unit 20, in the valve housing 26 or valve carrier thereof, are fed with pressurized oil via the duct plate 24 of the hydraulic control unit.

FIG. 3 schematically shows a hydraulic valve 28 which serves for pressure regulation and/or throughflow regulation and which controls and actuates only the starting clutch. The hydraulic valve 28 has a movable element 30 which serves to control an oil flow from an inflow 31 to an outflow 33. In one preferred refinement, the movable element 30 has a control piston 32 which is coupled to an armature 34 which, by a coil 36, can be deflected out of a rest position counter to the force of a spring 38 electromagnetically. By use of control edges, control bores or grooves 40, the control piston 32 opens up different flow cross sections for pressurized oil between the inflow 31 and the outflow 33, such that an oil pressure which serves for actuating the clutch, and/or an oil quantity which serves for actuating the clutch, is adjusted by a corresponding activation of the coil 36 of the hydraulic valve 28.

FIG. 4 schematically shows a motor vehicle having the transmission 10 and with control (illustrated on an enlarged scale) provided by the transmission control unit 22 and the hydraulic control unit 20 with the valve housing 26. The valve housing 26 has in particular three hydraulic valves 44, 46, 48 which are arranged in the longitudinal direction 18 of the motor vehicle, and one hydraulic valve 28 which is arranged transversely with respect thereto. Here, a movement direction of the vibratory elements 50, 52, 54 in each of the hydraulic valves 44, 46, 48 corresponds substantially to the longitudinal direction 18 of the motor vehicle.

In contrast, the hydraulic valve 28 which serves for controlling the starting clutch is, according to the invention, aligned in such a way that the movement direction of its vibratory element 30 differs from the movement direction of the vibratory elements 50, 52, 54 of the other hydraulic valves 44, 46, 48, and is aligned to a lesser extent with the longitudinal axis 18 of the motor vehicle. The elements 56, 58, 60, 62 are spring-loaded slides, in each case one of which is assigned and hydraulically connected to one of the hydraulic valves 44, 46, 48, 28.

The slides 56, 58, 60, 62 serve to boost the control pressures which are generated by the hydraulic valves 44, 46, 48, 28 from a common oil pressure which is provided by the duct plate 24. In other words: each hydraulic valve serves to set a certain pressure, and each slide serves to boost such a set pressure in a predetermined way. The clutch actuators and gear selectors are actuated with the boosted pressures.

The inventors have recognized that the vibratory elements of hydraulic valves which are installed in the longitudinal direction 18 of the motor vehicle and can therefore vibrate in the longitudinal direction can be excited by longitudinal vibrations of the vehicle or of the transmission so as to perform their own longitudinal vibrations, and/or that a longitudinal vibration of the vibratory elements of hydraulic valves of the type can be boosted by longitudinal vibrations of the vehicle or of the transmission.

If a vibratory element of the type, for example the control piston 32, controls an oil pressure for a clutch activation, the longitudinal vibration of the vibratory element is under some circumstances manifested in a modulation of the contact pressure of the driver disk(s)/plates. As a result, the torque transmitted by the clutch during starting is likewise modulated, which can lead to a boosting of the longitudinal vibrations. The inventors have also recognized that the undesired behavior can make a significant contribution to the undesired judder of the clutch during starting.

As a result of the hydraulic valve 28 which serves for controlling the starting clutch being arranged so as to be turned out of the longitudinal direction 18 of the motor vehicle, the amplitudes of longitudinal vibrations of the control piston 32, or more generally of the vibratory element 30 of the hydraulic valve 28, caused by longitudinal vibrations of the motor vehicle are reduced.

The force component generated by longitudinal vibrations of the motor vehicle in the movement direction of the elastic element 30 is inter alia proportional to the cosine of the angle $\alpha$ between the longitudinal direction 18 of the motor vehicle and the movement direction of the elastic element 30.

Small angles $\alpha$ are therefore not sufficient to effectively reduce the undesired coupling-in effect. In the ideal case, the hydraulic valve 28 and therefore the movement direction of its vibratory element 30 are arranged orthogonally with respect to the longitudinal direction 18 of the motor vehicle. The cosine $\alpha$ is then zero and the coupling-in/feedback is correspondingly minimal. If the ideal cannot be realized for any reason, for example on account of a lack of space, an arrangement is preferable in which the angle $\alpha$ lies between 85 and 95°. In this case, in terms of order of magnitude, only approximately $\frac{1}{10}$ of the force which would act in the longitudinal direction of the motor vehicle is coupled in the movement direction of the elastic element. Should this also not be possible, then the angle should at least lie between 60 and 150° because the coupled-in force is then still less than or equal to half of the force which would act in the longitudinal direction 18 of the motor vehicle.

Here, the movement direction of the vibratory element 30 of the hydraulic valve 28 which controls only the starting clutch can be aligned to a greater extent with the transverse axis of the motor vehicle than the movement directions of the other vibratory elements. Alternatively or in addition, the hydraulic valve 28 which controls only the starting clutch may also be arranged such that the movement direction of its vibratory element 30 is aligned to a greater extent with the vertical axis of the motor vehicle.

The invention claimed is:

1. A hydraulic control unit set up to hydraulically actuate a starting clutch of a motor vehicle and gear selectors of a transmission of the motor vehicle, the hydraulic control unit comprising:

hydraulic valves having in each case at least one vibratory element, said hydraulic valves being aligned in the hydraulic control unit such that a movement direction of said vibratory elements of one of said hydraulic valves which controls only the starting clutch differs from a movement direction of said vibratory elements of other said hydraulic valves, and are aligned to a lesser extent with a longitudinal axis of the motor vehicle.

2. The hydraulic control unit according to claim 1, wherein the movement direction of said vibratory element of said hydraulic valve which controls only the starting clutch is aligned to a greater extent with a transverse axis of the motor vehicle than the movement direction of said vibratory elements of said other hydraulic valves.

3. The hydraulic control unit according to claim 1, wherein the movement direction of said vibratory element of said hydraulic valve which controls only the starting clutch is aligned to a greater extent with a vertical axis of the motor vehicle.

4. The hydraulic control unit according to claim 1, wherein an angle between the movement direction of said vibratory element, of said hydraulic valve which controls only the starting clutch, and a longitudinal direction of the motor vehicle is greater than 60° and less than 150°.

5. The hydraulic control unit according to claim 4, wherein an angle between the movement direction of said vibratory element, of said hydraulic valve which controls only the starting clutch, and the longitudinal direction of the motor vehicle is between 85° and 90°.

* * * * *